United States Patent [19]

Harman et al.

[11] 4,141,281

[45] Feb. 27, 1979

[54] PRESSURE FLUID OPERATED FEED DRIVE SYSTEM FOR A MOVABLE MEMBER

[75] Inventors: Julius Harman, Baginton; Michael E. Norman, Jesmond, both of England

[73] Assignee: Alfred Herbert Limited, Coventry, England

[21] Appl. No.: 700,203

[22] Filed: Jun. 28, 1976

[30] Foreign Application Priority Data

Jul. 9, 1975 [GB] United Kingdom ............... 28827/75

[51] Int. Cl.² ..................... F01B 15/00; F15B 15/17; F15B 11/16; F15B 13/06
[52] U.S. Cl. .................................. 91/216 R; 91/533; 91/417 R; 92/146
[58] Field of Search ............... 92/117, 146; 91/216 R, 91/216 A, 216 B, 217, 167 R, 411 B, 411 R, 413, 178, 417 R

[56] References Cited

U.S. PATENT DOCUMENTS

| | | | |
|---|---|---|---|
| 3,070,071 | 12/1962 | Cooper | 91/216 A |
| 3,507,352 | 4/1970 | Williamson | 91/411 R |
| 3,672,159 | 6/1972 | Sundin | 91/411 R |
| 3,805,670 | 4/1974 | Follows, Jr. | 91/417 R |
| 4,017,110 | 4/1977 | Pease et al. | 91/217 |

FOREIGN PATENT DOCUMENTS 605790 11/1934 Fed. Rep. of Germany ........ 92/117 R

*Primary Examiner*—Paul E. Maslousky

[57] ABSTRACT

A pressure fluid operated feed drive system for a movable member, and particularly for a slide of a machine tool, the system having a source of fluid pressure feeding a pair of interconnected piston and cylinder units connected between the member and a fixed support. The piston rod side areas of the pistons are arranged in effective opposition and valve means are provided to permit pressure fluid to be supplied selectively to the units to enable the member to be moved alternatively by a force derived from differing piston areas.

5 Claims, 4 Drawing Figures

PRESSURE FLUID OPERATED FEED DRIVE SYSTEM FOR A MOVABLE MEMBER

This invention relates to a pressure fluid operated feed drive system for a movable member, such as a machine tool slide, which system is selectively operable to permit the member to be driven alternatively at different speeds. In the case of a machine tool slide, the requirement would normally be for a relatively slow feed rate with high thrust for a machining operation, and a relatively high rate of traverse when the slide is under light load between machining passes for example.

An object of the present invention is to provide a pressure fluid operated feed drive system in simple and convenient form which permits the aforesaid requirements to be fulfilled.

According to the invention, a pressure fluid operated feed drive system for a movable member comprises a source of fluid pressure, a pair of interconnected piston and cylinder units arranged to be fed from said source, a piston rod extending from a face of each piston, the units being connected between the member and a fixed support with the rod side annular piston areas in effective opposition, and valve means operable to permit pressure fluid to be supplied selectively to the units such that the member may be moved alternatively under the action of a force derived from differing piston areas.

In one convenient arrangement, the cylinders are of equal cross-sectional area and the piston rods are of equal cross-sectional area, and the valve means is arranged so that a single effective piston area is obtained by connecting one pair of like sides of the pistons in series between the pressure source and a low pressure location such as a reservoir or tank and placing the other pair of like sides in communication, and a combination of effective areas is obtained by connecting pairs of piston areas in parallel between the source and tank, each such pair being composed of the full area of one piston and the rod side annular area of the other.

In an alternative arrangement, the cylinders are of different cross-sectional areas and piston rods are of equal cross-sectional areas, the valve means being arranged so that a first effective piston area is obtained by supplying the two sides of one piston in opposition and connecting the other piston areas in series between the source and tank, and a second effective area is obtained by connecting pairs of piston areas in parallel between the source and tank, each such pair being composed of the full area of one piston and the rod side annular area of the other.

In a further alternative arrangement, the piston rods are of equal cross-sectional areas, the valve means being arranged so that a first effective piston area is obtained by supplying two sides of different pistons in opposition and connecting the other two sides in series to tank, and a second effective area is obtained by connecting pairs of pistons in parallel between the source and tank, each pair being composed of the full area of one piston and a rod side annular area of the other.

Some embodiments of the drive system of the invention will now be described, by way of example, with reference to the accompanying diagrammatic drawings, in which FIGS. 1 to 4 are respectively diagrammatic representations of four different embodiments of the system.

Figure 1:
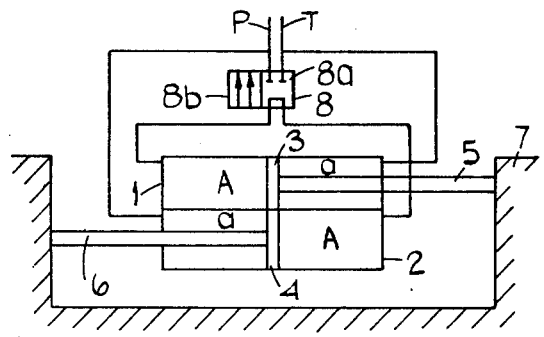
FIG. 1 is a schematic view of a feed drive system embodying the present invention and showing an arrangement of the valve and conduit connection for circulation of fluid between a source and piston/cylinders thereof.

Referring to FIG. 1 of the drawings, this shows a pair of cylinders 1 and 2 which are rigidly interconnected. Each cylinder has a respective piston 3, 4 therein for fluid-tight sliding engagement with the cylinder walls, the respective piston rods 5 and 6 of the pistons 3 and 4 extending in opposite directions and being rigidly secured to a fixed support 7 which may be a frame or bed of a machine tool for example. With the piston rods so fixed, forces developed within the cylinders will move the cylinders with respect to the rods and the cylinders are drivingly connected to a movable member (not shown) which may conveniently be a machine tool slide to be driven relative to the frame or bed 7. It will be appreciated, however, that the arrangement could be reversed with the cylinders fixed and movable pistons connected to the member to be driven.

It is also possible for one cylinder to be carried by the moving member, with the other cylinder connected to a stationary bed or frame, with the piston rod connections following the same pattern necessarily, so that a reverse arrangement of geometrical functions is achieved, although in fact both piston rods are pointing in the same direction with regard to the pistons themselves.

Fluid under pressure is supplied from a pressure source such as a pump (not shown) by means of a conventional directional valve 8, such as a spool valve, which selectively provides the connections indicated respectively at 8a and 8b, giving respectively a rapid drive rate at low thrust from a relatively small net piston area and a slow feed rate at high thrust from a relatively large net piston area. The cylinders 1 and 2 are divided by the pistons 3 and 4 into pairs of effective cylinders, those at the full area sides of the pistons being of cross-sectional area A and those at the rod sides of the pistons being of cross-sectional area a. When the directional valve is in the position shown, the effective cylinders a are connected in series between the pressure input line P and the tank T and the effective cylinders A are simply placed in communication to enable fluid to be displaced between them. This arrangement is used for rapid traverse under light load and the ratio in this case between the piston areas when connected in the two alternative modes is $A + a/a > 2$. With the directional valve in its alternative position, the cylinders are connected together in parallel pairs between the line P and T, each pair including a piston area A and an area a. This provides a large effective area $A + a$ for slow feed under high thrust. The above ratio may be varied by altering the sizes of the rods employed.

Figure 2:
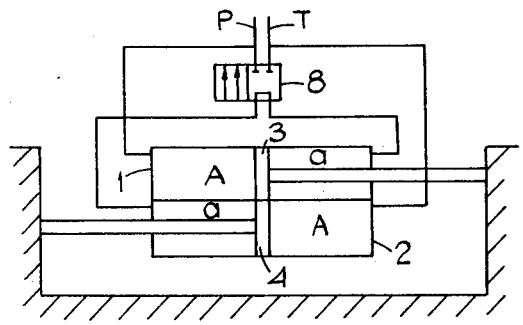
FIG. 2 is a schematic view of the system of FIG. 1 showing another conduit arrangement.

In FIG. 2, the directional valve provides the same connection as in FIG. 1 for slow feed, but an alternative connection for rapid traverse; it will be seen that in this case, the ratio between the piston areas when connected in the two alternative modes is $A + a/A < 2$. It will be appreciated that in the arrangements of FIGS. 1 and 2, the cylinders must be of equal cross-sectional areas, as must be the rods, in order to avoid the production of unbalanced displaced volumes during operation of the cylinders.

Figure 3:
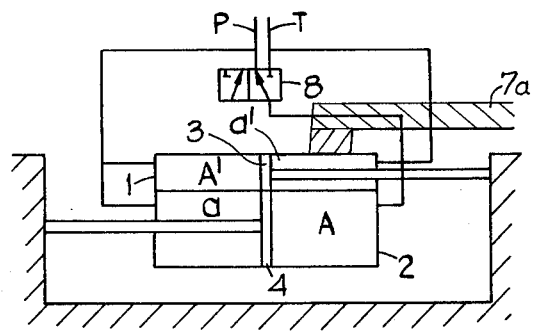
FIG. 3 is a schematic view of FIG. 1 showing a modification of the piston/cylinder arrangement according to the present invention.

FIG. 3 provides an arrangement enabling cylinders of different cross-sectional areas to be employed, these dividing into effective cylinder areas A, A', a and a'. The cross-sectional areas of the rods must be equal to each other. In this arrangement, in the rapid traverse mode, the effective areas A' and a are connected to area A and the net area in this case is therefore a'. For slow feed, a simple parallel connection is adopted as before, giving a net area $A + a' = A' + a$. In the above arrangement, the cylinders could, if desired, be of equal cross-sectional areas.

Figure 4:
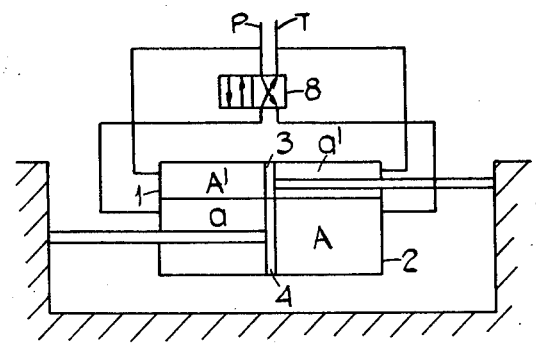
FIG. 4 is a view of the system of FIG. 3 showing another arrangement of fluid conduit and circulation.

A further alternative arrangement is shown in FIG. 4 in which the cylinders are again of different cross-sectional area, (in this arrangement necessarily so since with equal areas, $A - A'$ would equal zero) splitting into effective cylinders of respective cross-sectional areas A, A', a and a'. The cross-sectional areas of the rods are again essentially equal to each other. The servo valve is arranged in this case to provide two pairs of effective cylinders A' and A, and a' connected in series between the lines P and T. This arrangement provides a net piston area of $A - A' = a - a'$ for the rapid traverse mode. In this arrangement, the slow feed is again achieved by a simple parallel connection between pairs of cylinders.

It will be appreciated that in the system of the invention, due to the particular manner in which the various piston areas are combined, the flow rate always remains balanced and it is not therefore necessary to make any provision for external displacement of oil, with its attendant difficulties of collection and re-circulation or disposal; the system also permits satisfactory values to be achieved alternatively for rapid traverse and feed rates.

We claim:

1. A pressure fluid operated feed drive system for moving a member relative to a fixed support comprising a single source of fluid under pressure, a pair of double acting piston and cylinder units each of said cylinder units having two chambers arranged to be fed from said source, a piston rod extending from one side of each piston, the other side of each piston being a full side said piston rods being of equal cross section and the piston rod of one unit extending in a direction opposite to the direction of the piston rod of the other unit, said respective pairs of piston rods and cylinders being rigidly interconnected, one of said rigidly interconnected piston rod pairs and cylinder pairs being connected to the movable member and the other of said interconnected piston pairs and cylinder pairs being connected to said fixed support, and valve means operable so that a first effective piston area is obtained by connecting the chambers on opposite sides of one piston to the source and connecting the chambers on opposite sides of the other piston in series between the source and a receiving tank, and a second effective area is obtained by connecting the full side of the other piston and the rod side of the one piston the source and the full side of one piston and the rod side of the other piston to tank to permit pressure fluid to be simultaneously supplied and withdrawn from the cylinder chambers in a regenerative system selectively to and from the units such as to provide a differential pressure on said pistons that the member may be moved alternatively under the action of a force derived from differing piston areas.

2. A drive system according to claim 1 wherein the valve means is a spool valve.

3. A drive system according to claim 1 wherein both piston rods are connected to said fixed support and both cylinders are connected to said member.

4. A drive system according to claim 1 wherein said member is a tool slide and said fixed support is a frame of a machine tool.

5. A machine tool incorporating a feed drive system according to claim 1.

* * * * *